(12) United States Patent
He et al.

(10) Patent No.: US 9,671,555 B2
(45) Date of Patent: Jun. 6, 2017

(54) DISPLAY DEVICE

(71) Applicant: BOE TECHNOLOGY GROUP CO., LTD., Beijing (CN)

(72) Inventors: Jianmin He, Beijing (CN); Qin Chen, Beijing (CN); Enmin Niu, Beijing (CN)

(73) Assignees: BOE TECHNOLOGY GROUP CO., LTD., Beijing (CN); BEIJING BOE VISION-ELECTRONIC TECHNOLOGY CO., LTD., Beijing (CN)

( * ) Notice: Subject to any disclaimer, the term of this patent is extended or adjusted under 35 U.S.C. 154(b) by 434 days.

(21) Appl. No.: 14/361,921

(22) PCT Filed: Dec. 12, 2013

(86) PCT No.: PCT/CN2013/089309
§ 371 (c)(1),
(2) Date: May 30, 2014

(87) PCT Pub. No.: WO2014/201820
PCT Pub. Date: Dec. 24, 2014

(65) Prior Publication Data
US 2016/0341893 A1    Nov. 24, 2016

(30) Foreign Application Priority Data
Jun. 17, 2013   (CN) .......................... 2013 1 0239550

(51) Int. Cl.
*G02B 6/10*   (2006.01)
*H04N 5/64*   (2006.01)
(Continued)

(52) U.S. Cl.
CPC .............. *G02B 6/102* (2013.01); *G06F 1/16* (2013.01); *G06F 1/1601* (2013.01);
(Continued)

(58) Field of Classification Search
CPC ..................................................... G02B 6/102
See application file for complete search history.

(56) References Cited

U.S. PATENT DOCUMENTS

| 9,122,032 B2 * | 9/2015 | Tada ........................ G02B 6/10 |
| 9,363,460 B2 * | 6/2016 | Nakao .................. H04N 5/4403 |
| 2012/0127141 A1 * | 5/2012 | Choi ........................ H04N 5/64 345/207 |

FOREIGN PATENT DOCUMENTS

| CN | 201533360 U | 7/2010 |
| CN | 202889502 U | 4/2013 |

(Continued)

OTHER PUBLICATIONS

Machine translation of JP2004-274407 (publication date Sep. 30, 2004).*
(Continued)

*Primary Examiner* — Sung Pak
(74) *Attorney, Agent, or Firm* — Ladas & Parry LLP

(57) ABSTRACT

A display device includes a display screen and a frame disposed around the display device, an infrared receiver and a light guide member, wherein the light guide member has a securing surface through which the light guide member is secured to the frame, the light guide member further including a receiving end and a light exiting surface, the receiving end formed at a display side of the display device, a width of the receiving end in a direction perpendicular to the frame to which the light guide member is secured is narrower than a width of the light exiting surface in the direction. Only a narrower portion of the light guide member can be seen when a human being looks at the display device, thus improving display effect of the narrow frame of the display device.

20 Claims, 3 Drawing Sheets

(51) Int. Cl.
*G06F 1/16* (2006.01)
*H04N 5/44* (2011.01)

(52) U.S. Cl.
CPC ......... *G06F 1/1698* (2013.01); *H04N 5/4403* (2013.01); *H04N 5/64* (2013.01); *G06F 2200/1631* (2013.01); *H04N 2005/4426* (2013.01)

(56) References Cited

FOREIGN PATENT DOCUMENTS

| | | | |
|---|---|---|---|
| EP | 1347324 | A2 | 9/2003 |
| JP | 07-87424 | A | 3/1995 |
| JP | 10243481 | A | 9/1998 |
| JP | 2001-148666 | A | 5/2001 |
| JP | 2003-304206 | A | 10/2003 |
| JP | 2003304206 | A | 10/2003 |
| JP | 2004-4274407 | A | 9/2004 |
| JP | 2004274407 | A | 9/2004 |

OTHER PUBLICATIONS

Korean Office Action Appln. No. 10-2014-7014732; Dated Aug. 22, 2015.
International Preliminary Report on Patentability issued Dec. 22, 2015; PCT/CN2013/089309.
Second Chinese Office Action Appln. No. 201310239550.4; Dated Apr. 29, 2015.
First Chinese Office Action Appln. No. 201310239550.4, Dated Oct. 29, 2014.
International Search Report Issued Mar. 4, 2014; Appln. No. PCT/CN2013/089309.
Extended European Search Report dated Oct. 19, 2016; Appln. No. 13854235.2-1801/3012819 PCT/CN2013089309.

* cited by examiner

DISPLAY DEVICE

TECHNICAL FIELD

Embodiments of the present invention relate to the technical field of a display device, and more particularly, relate to a display device.

BACKGROUND

Remote control technique is a technique commonly used in current household appliances. Among various remote control techniques, infrared control technology is a common one, for example, a remote controller used in a TV set is an infrared remote controller. An infrared control signal is one of optical signals and is directional. Thus, the infrared remote controller should be kept in a line with an infrared receiver when in use.

FIGS. 1 and 2 illustrate display dives of conventional techniques, wherein FIG. 1 is a schematic structural diagram of a display device of conventional techniques and FIG. 2 is a schematic structural diagram of the display device as illustrated in FIG. 1 taken in direction A. The display device comprises a display screen 01, an opaque frame 02 disposed around periphery of the display screen 01, a light guide member 03 disposed at the bottom of the opaque frame 02, the light guide member 03 having a thickness the same as the thickness of the opaque frame, and an infrared receiver 04 disposed corresponding to a incident face 031 of the light guide member 03. Of course, there is a display device with another structure wherein the light guide member 03 is disposed in the opaque frame, as illustrated in FIG. 3.

For display device with such two structures, when in use, the infrared control signal transmitted by the infrared remote controller is transmitted to the infrared receiver 04 through the light guide member 03 such that the infrared receiver 04 can receive the infrared control signal transmitted by the infrared remote controller.

The inventor of the present application found that, the display devices with such two structures have a projection at the bottom frame or have an excessively wide frame, which obstructs the frame of the display device to get slimmer.

SUMMARY

Embodiments of the present application provide a display device, in order to solve the technical problem that the display device has an excessively wide bottom frame in conventional techniques.

To solve the above technical problem, embodiments of the present application provide a technical solution as below:

A display device, comprising a display screen, a frame configured around the display screen, the display device further comprising: an infrared receiver and a light guide member;

wherein the light guide member has a securing surface and is mounted to the frame through the securing surface, the light guide member further has a receiving end and a light exiting surface, the receiving end formed at the display side of the display screen, a width of the receiving end at a direction perpendicular to the frame to which it is secured is narrower than a width of the light exiting surface in the direction.

The receiving end has a first receiving surface and a second receiving surface, the first receiving surface intersects with the securing surface and is parallel to the display screen, the second receiving surface intersects with the first receiving surface and is opposite to the securing surface, and is not parallel to the display screen.

According to one embodiment of the present application, the light guide member has a groove for receiving the infrared receiver, the infrared receiver facing the light exiting surface of the light guide member.

In some optional implementations, the receiving end receives an infrared control signal and changes its transmission direction so as to transmit it to the infrared receiver, and a distance between the second receiving surface and the securing surface in a direction perpendicular to the frame gradually increases from the first receiving surface to the light exiting surface.

In some optional implementations, the second receiving surface is a cambered surface.

In some optional implementations, the second receiving surface is a plane, and an included angle formed between the second receiving surface and the securing surface of the receiving end is in a range of 30° to 70°.

In some optional implementations, the light guide member is made of a transparent material.

In some optional implementations, the transparent material is glass, resin, polymethyl methacrylate, or plastic.

In some optional implementations, the securing surface is adhered to the frame.

In some optional implementations, the light guide member is secured to the frame by means of a bolt.

In some optional implementations, the infrared receiver is mounted in the groove by means of a bolt.

In some optional implementations, the infrared receiver is adhered to the groove.

In the display device provided by embodiments of the present application, the transmission direction of the infrared control signal is changed by disposing a light guide member such that the infrared receiver can also receive infrared remote control signal in the situation that position of the infrared receiver is shifted backwards (i.e., shifted towards the back of the display device). Furthermore, one person only see the narrower portion of the light guide member when viewing the display screen as the thickness of the receiving end in a direction perpendicular to the frame is narrower than the thickness of the light exiting surface of the light guide member in the direction. Thus, the display device provided by embodiments of the present application improves display effect of the narrower frame of the display device.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
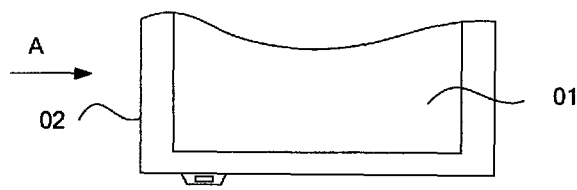
FIG. 1 is a schematic structure diagram of a display device provided by conventional technology.
Figure 2:
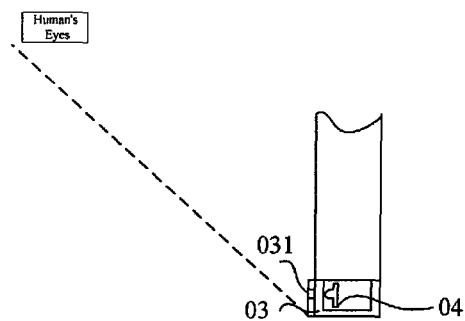
FIG. 2 is a schematic structure diagram of the display device illustrated in FIG. 1 and taken in direction A.
Figure 3:
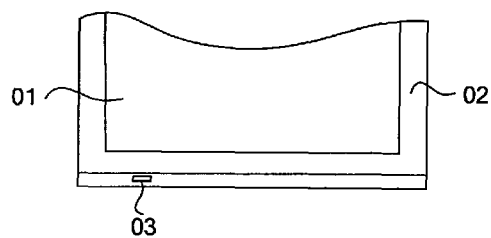
FIG. 3 is a schematic structure diagram of another display device provided in conventional technology.
Figure 4:
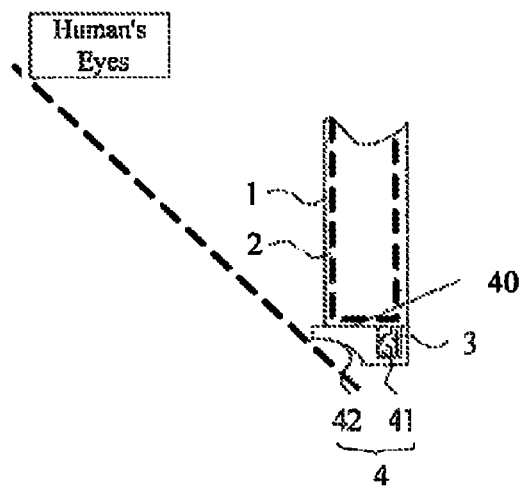
FIG. 4 is a schematic structure diagram of a first display device provided by embodiments of the present application.

Please refer to FIG. 4, which is a schematic structure diagram of a first display device provided by embodiments of the present application. The display device comprises a display screen 2 and a frame 1 disposed around periphery of the display screen 2, and also comprises an infrared receiver 3 and a light guide member 4.

The light guide member has a securing surface 40, and is secured to the frame 1 by means of the securing surface 40. The light guide member 4 further has a receiving end 42 and a light exiting surface, the receiving end formed at the display side of the display screen, and a width of the receiving end in a direction perpendicular to the frame to which it is secured is narrower than a width of the light exiting surface in the direction.

In practice, the light guide member is typically placed at the lower surface of the frame 1. However, the light guide member can also be disposed at other surface of the frame, for example, the top surface or the side surface. The lower surface of the frame 1 refers to the lower surface of the frame 1 when the display device is placed as illustrated in FIG. 4.

The receiving end of the light guide member according to this embodiment of the present application comprises a first receiving surface and a second receiving surface, the first receiving surface intersects with the securing surface of the light guide member and being parallel to the display side of the display device, the second receiving surface intersecting with the first receiving surface and being opposite to the securing surface.

It is explained that, when the receiving end 42 is placed at a position as illustrated in FIG. 4, a surface of the receiving end 42 facing human's eyes is the first receiving surface of the receiving end 42, the light guide member is secured to the frame through the securing surface, and a surface intersecting with the first receiving surface and opposite to the securing surface is the second receiving surface.

In the display device provided by embodiments of the present application, the first receiving surface and the second receiving surface of the receiving end 42 of the light guide member 4 receive infrared control signal and change its transmission direction, such that position of the infrared receiver 3 can be shifted backwards (i.e., towards the back side of the display device) in the situation that the infrared receiver 3 can receive the infrared control signal. As the width of the receiving end in the direction perpendicular to the frame to which the receiving end is secured is narrower than the width of the light exiting surface in the direction, only the narrower portion of the light guide member 4 (i.e., the first receiving surface of the receiving end 42) can be seen from the front side of the display screen.

Therefore, the display device provided by embodiments of the present application improves display effect of the narrow frame of a display device.

Furthermore, in order to facilitate the infrared receiver 3 to receive signals, the receiving end 42 receives infrared control signals and is capable of changing the transmission direction of the infrared control signals so as to transmit them to the infrared receiver 3. And moreover, a distance between the second receiving surface of the receiving end 42 and the securing surface of the receiving end in a direction perpendicular to the frame to which the receiving end 42 is secured is continuously increased.

There are various specific structures for the receiving end 42.

Please refer to FIG. 4 again. In the embodiment, the second receiving surface of the receiving end 42 is an arc surface. Of course, the shape of the arc surface is not limited to the curved shape as illustrated in FIG. 4, as long as only the narrowest portion (i.e. the first receiving surface) of the light guide member 4 is seen by human's eyes and the receiving end 42 can transmit the received infrared control signals to the infrared receiver 3.

Figure 5:
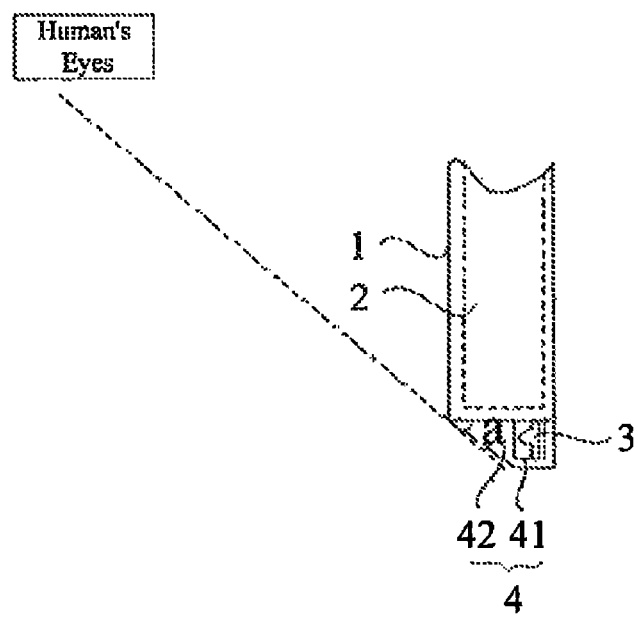
FIG. 5 is a schematic structure diagram of a second display device provided by embodiments of the present application.

Please refer to FIG. 5, which is a schematic structural diagram of a second display device according to embodiments of the present application. In this embodiment, the second receiving surface of the receiving end 42 is a plane, and an included angle between the second receiving surface of the receiving end 42 and the securing surface of the receiving end 42 is in a range of 30° to 70°. For example, the included angle can be 30°, 40°, 50°, 60°, 70° and etc., and will not be elaborated herein.

In order to facilitate to understand the transmission path of the light in the receiving end 42, the transmission path of the light in the receiving end 42 will be described hereinafter by taking a display device with the structure illustrated in FIG. 4 as an example and in connection with FIG. 6, which is a diagram illustrating transmission path of light in the receiving end of the light guide member of the first display device provided by embodiments of the present application. At the same time, for purpose of describing the optical path, terms "a first interface", "a second interface" and "a third interface" are introduced hereinafter, corresponding to the second receiving surface 421, the securing surface 422 and the light exiting surface 423, respectively.

Figure 6:
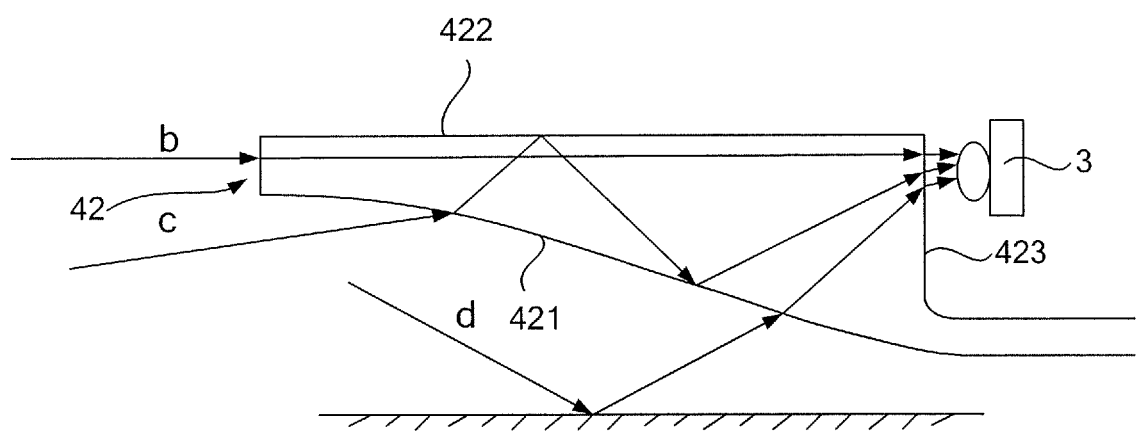
FIG. 6 is a diagram illustrating transmission path of light in the receiving end of a light guide member of the first display device provided by embodiments of the present application.

Please refer to FIG. 6. when infrared light transmitted by the remote controller incidents on the first receiving surface 420 perpendicularly, i.e., the first incident light b as illustrated in FIG. 6, the first incident light b enters the infrared receiver 3 linearly without any refraction or any reflection.

When infrared light transmitted by the remote controller incidents on the second receiving surface 421 of the receiving end 42, i.e., a second incident light c as illustrated in FIG. 6, the second incident light c will incident on the second interface (i.e., the securing surface 422) after the first refraction at the first interface (the first receiving surface 421), and will incident on the first interface (i.e., the second receiving surface 421) again after the first reflection at the second interface, and then incident on the third interface (i.e., the light exiting surface 423) after the second reflection at the first interface (i.e., the second receiving surface 421), and finally incident on the infrared receiver 3 after a second refraction at the third interface (i.e., the light exiting surface 423).

In order to improve the efficiency of the infrared light, it is desired that both the first reflection and the second reflection of the second incident light b at the second interface 422 and at the first interface 421 are total reflection so as to improve the efficiency of the infrared light.

The total reflection refers to a phenomenon that, when light travels from an optically denser medium (i.e., refraction index of light in the medium is bigger) to an optically thinner medium (i.e., refraction index of light in the medium is smaller), all the light will be reflected to the preceding medium.

When the infrared light transmitted by the remote controller is incident on a surface of external medium (such as a surface of the ground or a table and etc.) rather than entering the receiving end 42, that is to say, the light is the third incident light d as illustrated in FIG. 6, the third incident light d will be incident on the first interface (that is the second receiving surface 421) after a first reflection at the surface of the external medium, and then will be incident on the third interface (that is the light exiting surface 423) after a first refraction at the first interface, and finally, will be incident on the infrared receiver 3 after a second refraction at the third interface.

Of course, the transmission paths of light are not limited to the three manners as described above as there are various angles of the incident light. However, the principle is that light will be incident on the infrared receiver after reflections and/or refractions in the receiving end (except the perpendicularly incident light). The three transmission paths of light listed here are representative. As for transmission direction of other light incident on the receiving end with other angles, it will not be elaborated here.

The light guide member with such structures as described above are made of transparent material in order to facilitate the transmission of light in the member. Further, the transparent material can be glass, resin, polymethyl methacrylate, or plastic. Of course, the transparent material is not limited hereto, and will not be elaborated here. If the light guide member is made of polymethyl methacrylate, which has a refraction index of 1.49, then, light with an incident angle greater than 42.2° will be totally reflected.

Optionally, the securing surface of the light guide member is adhered to the lower surface of the frame 1. Alternatively, the light guide member is fixed to the frame 1 by means of a bolt. Of course, the light guide member 4 can be fixed to the frame 1 by means of a fastener and a bayonet, wherein the bayonet is configured on a securing surface of the frame 1 and the fastener is configured on the light guide member 4, or the fastener is configured on a securing surface of the frame 1 and the bayonet is configured on the light guide member 4. The fixing manner between the light guide member 4 and the frame 1 will not be elaborated herein.

Optionally, the infrared receiver 3 can be mounted in a groove 41 by means of a bolt. Otherwise, the infrared receiver can be adhered in the groove 41. Of course, the infrared receiver 3 and the groove 41 can also be connected to each other and fixed together by means of a fastener and a bayonet, wherein the bayonet is configured on the infrared receiver 3 and the fastener is configured on the groove 41, or the fastener is configured on the infrared receiver 3 and the bayonet is configured on the groove 41. The fixing manner between the infrared receiver 3 and the groove 41 will not be elaborated herein.

The display device according embodiments of the present application can be a liquid crystal TV, and can also be other display device in which the infrared remote control is utilized. It will not be elaborated herein.

The foregoing are merely exemplary embodiments of the invention, but are not used to limit the protection scope of the invention. The protection scope of the invention shall be defined by the attached claims.

The invention claimed is:

1. A display device comprising a display screen and a frame disposed around the display screen, the display device further comprising:
   an infrared receiver; and
   a light guide member having a securing surface, the light guide member being secured to an outside of the frame through the securing surface;
   the light guide member further comprising a receiving end and a light exiting surface, the receiving end formed at a display side of the display screen, a width of the receiving surface in a direction perpendicular to the frame to which the light guide member is fixed is narrower than a width of the light exiting surface in the direction.

2. The display device according to claim 1, wherein the light guide member has a groove for receiving an infrared receiver which is mounted facing to the light exiting surface of the light guide member.

3. The display device according to claim 1, wherein the receiving end has a first receiving surface and a second receiving surface for receiving infrared control signals, the first receiving surface being parallel to the display side of the display screen, and the second receiving surface intersecting with the first receiving surface and opposite to the securing surface.

4. The display device according to claim 3, wherein the receiving end receives the infrared control signals and changes transmission direction thereof so as to transmit the signals to the infrared receiver, and a distance between the securing surface of the light guide member through which the light guide is secured to the frame and a surface of the light guide member opposite to the securing surface is continuously increased in a direction from the receiving end to the light exiting surface.

5. The display device according to claim 1, wherein a lower surface of the receiving end is an arc surface.

6. The display device according to claim 1, wherein a lower surface of the receiving end is a plane, and an included angle between the lower surface of the receiving end and an upper surface of the receiving end is in a range of 30° to 70°.

7. The display device according to claim 1, wherein the light guide member is made of transparent material.

8. The display device according to claim 7, wherein the transparent material is glass, resin, polymethyl methacrylate, or plastic.

9. The display device according to claim 1, wherein the securing surface of the light guide member is adhered to the frame.

10. The display device according to claim 1, wherein the light guide member is fixed to the frame by means of a bolt.

11. The display device according to claim 2, wherein the infrared receiver is mounted in the groove by means of a bolt.

12. The display device according to claim 2, wherein the infrared receiver is adhered to the groove.

13. The display device according to claim 2, wherein the receiving end has a first receiving surface and a second receiving surface for receiving infrared control signals, the first receiving surface being parallel to the display side of the display screen, and the second receiving surface intersecting with the first receiving surface and opposite to the securing surface.

14. The display device according to claim 2, wherein a lower surface of the receiving end is an arc surface.

15. The display device according to claim 2, wherein a lower surface of the receiving end is a plane, and an included angle between the lower surface of the receiving end and an upper surface of the receiving end is in a range of 30° to 70°.

16. The display device according to claim 2, wherein the light guide member is made of transparent material.

17. The display device according to claim 2, wherein the securing surface of the light guide member is adhered to the frame.

18. The display device according to claim 2, wherein the light guide member is fixed to the frame by means of a bolt.

19. The display device according to claim 3, wherein a lower surface of the receiving end is an arc surface.

20. The display device according to claim 3, wherein a lower surface of the receiving end is a plane, and an included angle between the lower surface of the receiving end and an upper surface of the receiving end is in a range of 30° to 70°.

\* \* \* \* \*